(12) United States Patent
Graham et al.

(10) Patent No.: US 10,909,131 B1
(45) Date of Patent: Feb. 2, 2021

(54) METHOD AND SYSTEM FOR INDEXING AND SEARCHING DATA SUB-STREAMS

(71) Applicant: EMC IP Holding Company LLC, Hopkinton, MA (US)

(72) Inventors: Stephen G. Graham, Chapel Hill, NC (US); Aaron W. Spiegel, Stilwell, KS (US); Paul R. Kingston, Cumming, GA (US); Flavio Paiva Junqueira, Barcelona (ES); Dominique Prunier, Montreal (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 257 days.

(21) Appl. No.: 15/581,675

(22) Filed: Apr. 28, 2017

(51) Int. Cl.
*G06F 16/248* (2019.01)
*G06F 16/22* (2019.01)
*G06F 16/2455* (2019.01)

(52) U.S. Cl.
CPC ........ *G06F 16/248* (2019.01); *G06F 16/2228* (2019.01); *G06F 16/24568* (2019.01)

(58) Field of Classification Search
CPC ............. G06F 16/248; G06F 16/24568; G06F 16/2228
USPC ....................................................... 707/722
See application file for complete search history.

(56) References Cited

U.S. PATENT DOCUMENTS

| 7,979,439 B1* | 7/2011 | Nordstrom | G06F 17/30312 707/741 |
| 10,452,675 B1* | 10/2019 | Sivasubramanian | G06F 16/2228 |
| 2001/0051958 A1* | 12/2001 | deVries | G06F 17/30817 715/233 |
| 2005/0216443 A1* | 9/2005 | Morton | G06F 16/447 |
| 2016/0127795 A1* | 5/2016 | Mason | G06F 16/71 725/53 |

\* cited by examiner

*Primary Examiner* — Alicia M Antoine
(74) *Attorney, Agent, or Firm* — Womble Bond Dickinson (US) LLP

(57) ABSTRACT

Systems and methods are disclosed for efficiently indexing stream data to facilitate full-text search of the stream data. A stream comprises large amount of data, only some of which is deemed useful for full-text search indexing. An administrator can specify an indexing specification for a stream. The indexing specification can specify one or more sub-streams within the stream for indexing, and/or specify one or more time intervals of stream data for indexing. A query against the stream can specify the indexing specification to use to index the stream before returning results for the query. The query can alternatively specify an indexing specification to apply to a previously indexed stream. Full-text search indexes generated using an indexing specification can return results that are more relevant to a user because the results are more narrowly focused than an index of, e.g., the entire stream.

21 Claims, 7 Drawing Sheets

METHOD AND SYSTEM FOR INDEXING AND SEARCHING DATA SUB-STREAMS

TECHNICAL FIELD

This disclosure relates to the field of efficiently indexing portions of a stream of data and generating a full-text search index for the indexed portion of the stream of data.

BACKGROUND

A stream is a sequence of data elements made available over time. A video stream, for example, can comprise a sequence of video data elements made available to a device for viewing the video in an ordered, time-sequenced manner. A client device can request one or more streams from one or more sources. A video stream with an audio stream, for example, may be requested by a client device. The client device then processes the one or more streams as separate streams.

It is desirable to be able to query stream data using a full-text search. A streaming service may ingest a substantial number of streams. Each stream of data may be as much as a terabyte of more. Systems of the prior either index all of a stream, or none of a stream. Indexing a terabyte of stream data requires substantial computing resources, input/output operations, memory, and storage. Further, a query against a large index will produce a substantial number of matching results. A user must filter through the results, refine her search query, and keep iterating the process until a reasonable number of results are obtained for her purpose. If the stream is not indexed, finding query results requires a brute force search through the stream data to find results relevant to a user query. Iterating a search using unindexed, brute force searching is very slow. Reviewing a large number of results to find relevant results, even if fully indexed, is also time consuming.

BRIEF DESCRIPTION OF THE DRAWINGS

Embodiments of the invention are illustrated by way of example, and not by way of limitation, in the figures of the accompanying drawings in which like reference numerals refer to similar elements.

In the following description of the figures, the inventive concepts herein have been described with respect to generate indexes for a stream of data, and to use those indexes to generate a full-text search index in a streaming service comprising a cluster of nodes. However, the disclosure is not to be construed as limited to a cluster of nodes. A single server can perform the operations described herein.

DETAILED DESCRIPTION

Figure 1:
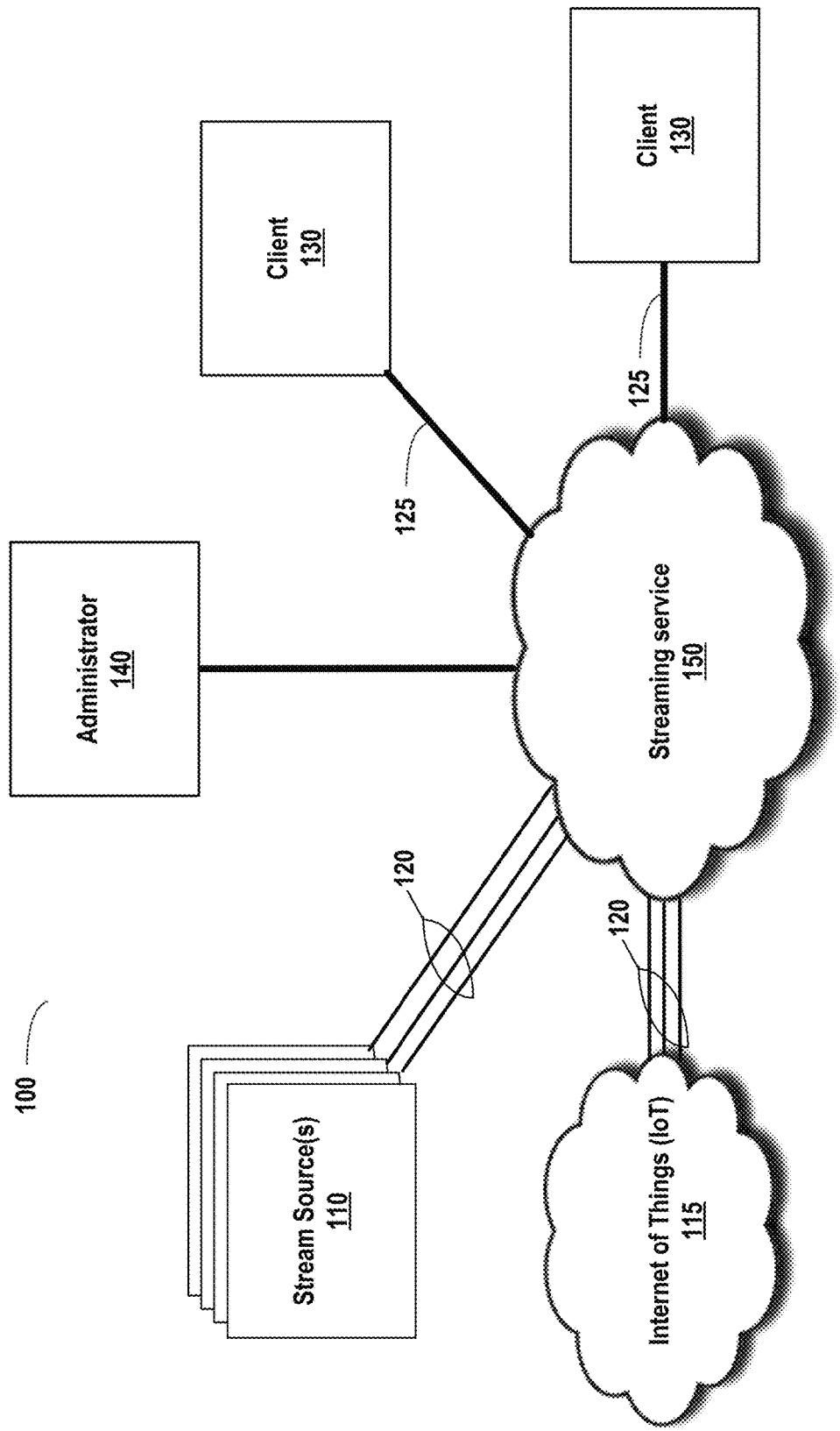
FIG. 1 illustrates, in block diagram form, an overview of an infrastructure for efficiently indexing a data stream and generating a full-text search index from the indexed data stream, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are disclosed for indexing a portion of a stream of data in accordance with a stream indexing specification. An indexer of a stream service receives one or more stream index specifications associated with a stream. A stream index specification specifies a portion of stream data of the stream to index. A portion of stream data can comprise a subset of the sub-streams of the stream. A portion of the stream data can comprise a temporal subset of the stream data, for one or more intervals of time. The portion of the stream data can be both a subset of the sub-streams and a temporal subset of the stream data. The indexer can generate one or more stream indexes for the portion of stream data in accordance with the one or more stream index specifications. In an embodiment, the indexer can receive a change to one or more of the stream index specifications, and generate one or more stream indexes for a second portion of the stream data in accordance with the one or more changed stream index specifications.

In another embodiment, a query processor can process a client query for a subset of stream data by receiving the query from the client device for a subset of stream data. The query can include a reference to an index of at least a portion of the subset of stream data. The query processor can identify query results using the index of at least the portion of the subset of the stream data, and returning the query results to the client device. In an embodiment, the portion of the subset of the stream data comprises at least one of: a sub-stream of the stream data indexed by the referenced index, or a sub-interval of a period of time of the stream data indexed by the referenced index.

Any of the methods described herein can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, or other types of invocations or parameters via the API. An exemplary API is described in detail below with respect to FIG. 6.

FIG. 1 illustrates, in block diagram form, an overview of an infrastructure 100 for efficiently indexing a data stream and generating a full-text search index from the indexed data stream, in accordance with some embodiments. Streams that are declared to be searchable within the streaming service 150 can be indexed on ingestion into the streaming service 150.

A streaming service 150 can receive streams 120 from stream sources 110 and from, e.g. Internet of Things (IoT) 115. Streaming service 150 can be implemented as a cluster having a plurality of nodes. Each of the plurality of nodes can comprise a computing device, such as is described with reference to FIG. 7, below. Stream sources 110, IoT 115, streaming service 150, client devices 130, and administrator 140 can communicate via network connections (not shown). As defined above, a stream is a sequence of data elements or records made available over time. A stream source can include, but is not limited to, a video or audio stream, an output stream from a computing device such as backup data or computer operation status statistics, data output from a sensor or collection of sensors such as heat, light, temperature, and door sensors, alarms systems, position or vehicle status data (e.g. smog emissions data, engine temperature, battery charge, speed information) from an automated driving, or conventional, vehicle, a radio stream, including data streamed from a cell phone, smart phone, or other personal digital device. A stream 120 can include data elements output from a network of devices (Internet of Things 115), such as devices from a home, business, or a manufacturing facility, including one or more appliance or machinery status outputs, lighting controls status outputs, alarm system monitoring outputs, video surveillance data, and numerous other data sources.

Streaming service 150 can receive data streams 120 and provision a session for each data stream 120. Provisioning can include allocating memory and processor resources, and storage for the receipt, buffering, storage, processing, indexing, and transmission of data received from the data stream 120. Streaming service 150 can generate an entry in a stream database 181 identifying the data stream 120, including a handle or unique identifier and a set of routing keys, and attributes generated from data and/or metadata of the data stream 120. In an embodiment, stream database 181 can include a security component that enforces which users are authorized to read from a stream 120. Streaming service 150 can receive records from data stream 120 for a period of time, then generate an index for the records, and write the generated index and records to an indexed stream data file 185. The generated index can be self-referential, i.e., the index of terms for the interval can refer, e.g. by pointer, to terms in the received records for the interval. The self-referential indexed stream data file 185 is efficient; the indexed data stream saves space over having separate index and stream data files of the prior art. In addition, the indexed stream data file 185 facilitates maintenance of stream data.

Deleting the indexed stream data file 185 also deletes the index data within the indexed stream data file 185.

An administrator 140 can provide indexing specifications 148 to an indexer 160. The indexer 160 can index all, or a portion, of a data stream 120 in accordance with the indexing specifications 148. Administrator 140 can share the indexing specifications 148 with application developers 135 so that application developers 135 can generate applications that utilize the indexed stream data 185 generated by indexer 160 in accordance with an indexing specification 148.

In an embodiment, streaming service 150 can generate a full-text search index 190 from indexed stream data file 185 over a plurality of intervals of time and/or a subset of a stream, as specified in an indexing specification 148. The subset of the stream can be a sub-stream of the data stream 120. In an embodiment, the subset of the data stream 120 can be a sub-interval in time of all of the data stream 120. In an embodiment, the full-text search index 190 can be in an inverted index. A stream processor 155 of the streaming service 150 can read log file data records for each of a plurality of intervals of records from the data stream 120, then generate an index for the terms in the log file data records in each interval in the plurality of intervals, as may be filtered by the indexing specification 148. Indexer 160 can then write the index and log file data records for each interval in the plurality of intervals to indexed stream data file 185. In an embodiment, streaming service 150 can generate the full-text search index 190 in response to a query against the indexed stream data file 185, in accordance with the indexing specification 148.

A client device 130 can query stream data of the streaming service 150. The query can specify an index for an active data stream 120 that is currently generating log data records, or an indexed stream data file 185. A query can also specify a start interval and end interval of data for the query, and a database action to perform on the results that satisfy the query. Alternatively the starting and ending time of the interval can be specified in the indexing specification 148 for the data stream. A database action can include search, update, delete, or read operations. A client 130 can be any type of computing device such as a personal computer (e.g., desktops, laptops, and tablets), a workstation, a handheld device, a Web-enabled appliance, a gaming device, a media player, a mobile phone (e.g., Smartphone), a virtual machine, a virtual machine host, a server, or any computing system operable to communicate over a storage area network. An exemplary client device 130 is described below with reference to FIG. 7.

Figure 2:
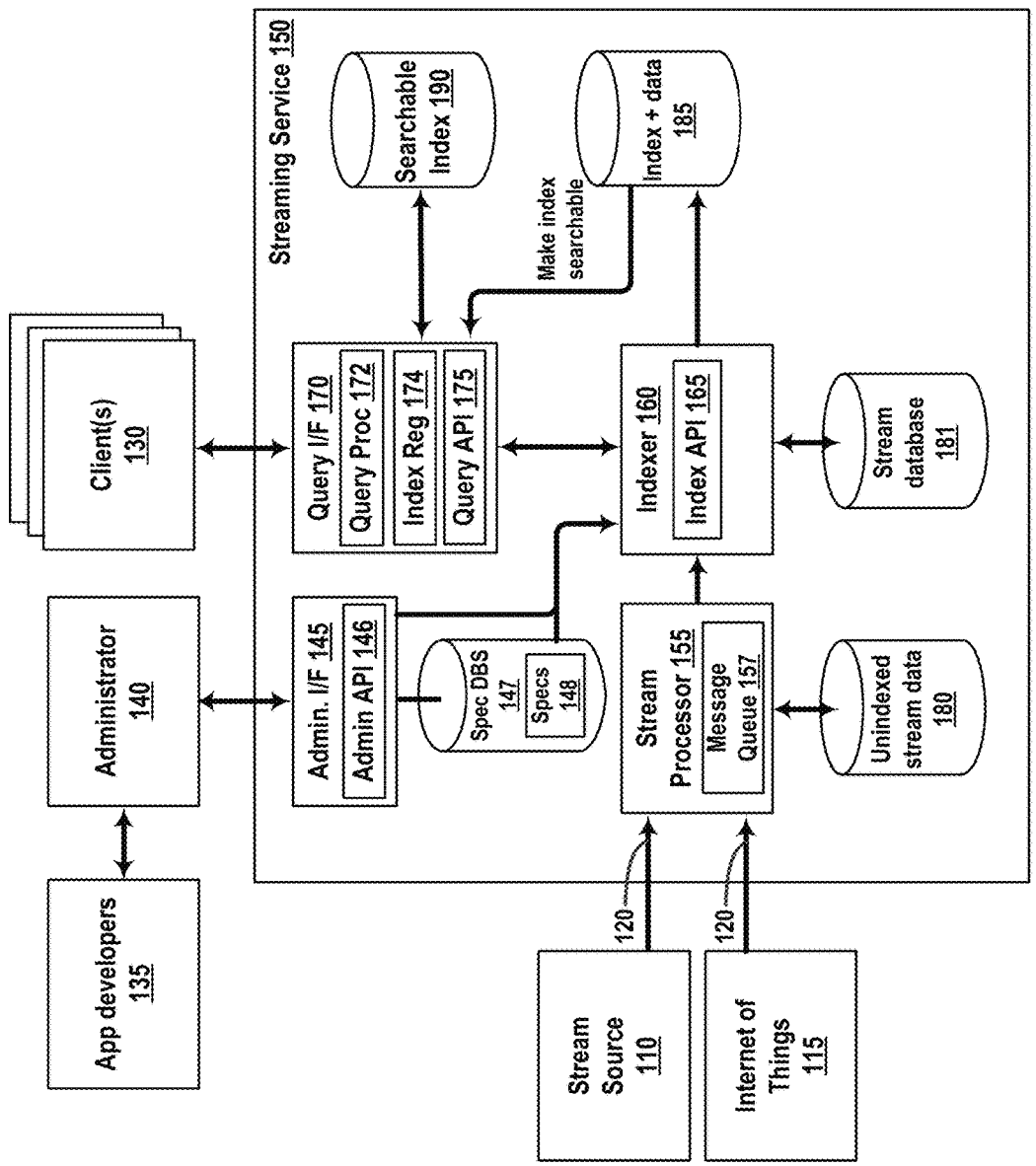
FIG. 2 illustrates, in block diagram form, a detailed view of an infrastructure for efficiently indexing a data stream and generating a full-text search index from the indexed data stream, in accordance with some embodiments described herein.

FIG. 2 illustrates, in block diagram form, a detailed view of an infrastructure 100 for efficiently indexing a data stream 120 and generating a full-text search index 190 from the indexed data stream 185, in accordance with some embodiments described herein. Streaming service 150 can be implemented across a cluster of nodes, each node comprising a computing device, such as described with reference to FIG. 7, below. Streaming service 150 can include an administrator interface 145, a stream processor 155, an indexer 160, and a query interface 170. Clients 130 can submit queries against indexes for stream data 120 and indexed stream data 185. Query processor 170 and query API 175 can be used to generate a full-text search index 190 of the stream data specified within the query received from the client device 130.

Administrator 140 can be a streaming service 150 administrator 140 using a computing device to communicate with streaming service 150 administrator interface 145. The computing device can be any type of computing device, such as described in detail below with reference to FIG. 7. The administrator 140 can define specifications for indexing data streams 120. An indexing specification 148 can declare that a stream is searchable, meaning that the stream will be indexed in some fashion, either in accordance with an indexing specification 148, or a default indexing scheme. A default indexing scheme can include indexing all terms in the stream of data. The indexing specification 148 can further specify one or more sub-streams of the data stream to index (a "vertical slice" of the stream data). The indexing specification 148 can further specify a window of time to index the data stream (a "horizontal slice" of the stream data), the window having a starting time and an ending time. The indexing specification 148 can further include one or more rules for indexing the particular stream, such as "don't index numbers," or "don't index words with fewer than 3 characters." The indexing specification 148 may further include a list of terms that should be indexed, and/or a list of terms that should not be indexed, irrespective of term frequency or term length. The indexing specification 148 can further include identifying information, metadata, and other data about the stream that may be relevant to an application developer, or a user querying the indexed data stream 185 generated from the data stream 120 using the indexing specification 148. Indexing specifications 148 can be specific to a data stream 120. In an embodiment, an indexing specification 148 can be applied to a classification of data streams 120, such as "all data streams originating from source 'X'". Indexing specifications 148 can be stored in specification database (DBS) 147. Indexer 160 can call administrator API 146 to obtain an indexing specification 148 for a data stream 120. In an embodiment, indexer 160 can directly access specification database 147 to obtain an indexing specification 148 for a data stream 120. In an embodiment, an indexing specification 148 can be associated with a data stream 120, or classification of data streams 120, in stream database 181.

Stream processor 155 can receive data streams 120 from stream sources 110 and/or Internet of Things (IoT) 115. Stream processor 155 can generate a message queue 157 for processing each data stream 120. The data stream 120 can include metadata describing attributes of the data stream 120, such as a make/model of the device generating the data, a location of the device generating the data, an owner of the device generating the data, a type of the data (binary, text, etc.), uses for the data, content of the data, and the like. The message queue 157 can receive raw data from stream 120 and generate log file data records for indexing and storage in an indexed stream data file 185. Indexer 160 can store, in stream database 181, a record of each received stream 120, including metadata about the stream. Metadata about the stream 120 can include how many replicas of indexed stream data file 185 may have been generated, the nodes on which the replicas are stored, whether the stream has been indexed, identifiers of the stream, and the like.

Indexer 160 can index data streams 120 in accordance with an indexing specification 148. Indexer 160 can obtain an indexing specification 148 for a data stream 120 from specification database 147 or via a call to administrator API 146. Indexer 160 can generate an indexed stream data file 185 for a stream that is declared searchable within the streaming service 150. An entry in stream database 181 can indicate that a stream is declared searchable within the streaming service 150. Indexer 160 can receive a plurality of stream log file data records over an interval of time from stream data 120. Indexer 160 can generate an index of the terms in the received plurality of stream log file records. In an embodiment, the index of terms for the plurality of stream log file records over the interval can be an inverted index. The index of terms, and the log file records used to generate the index of terms for the interval of time, can be written to indexed stream data file 185. The receiving of stream data log file records, indexing, and writing can be repeated for any number of intervals of time. In an embodiment, the time interval can be 1 second. An indexing specification 148 can specify a number of intervals, and a starting time or interval, to include in the index data stream 185.

Interval data and interval indexes can be dynamically scaled by merging a predetermined number of intervals of index and log data records. During the process of generating the indexed stream data file 185, indexer 160 can track the number of intervals index and plurality of log data records that have been written to the indexed stream data file 185. When the number of such intervals exceeds a threshold, such as 10 intervals, then indexer 160 can merge the indexes of the threshold number of intervals, and write to the index stream data file 185 a merged index and the plurality of intervals of data, each having a plurality of log data records. Once merged, the previously written index and log data records for the plurality of intervals can be marked for deletion. In an embodiment, the indexes for the plurality of intervals can be merged using mergesort, quicksort, B–Tree, binary tree, or other indexing method. In an embodiment wherein the intervals are each 1 second in during, and the threshold for merging is 10 intervals, the merged index and data records interval will then be 10 seconds of stream data. Merging can be iterative. If indexer 160 has merged a threshold number of intervals, for a second threshold number of times, then the merged indexes may be merged into a larger merged index for the second threshold number of merged indexes. Indexer 160 can write the larger merged index, and the plurality of merged intervals of log data records, to indexed stream data file 185. Indexer 160 can then mark for deletion the merged indexes and plurality of intervals of log data records used to generate the larger merged index and plurality of merged intervals of log data records. In an embodiment, the first and second merge thresholds can both be 10, such that a first merge generates 10 seconds of index and log data records and a second, larger merge generates 100 seconds of index and log data records.

After indexer 160 generates an indexed stream data file 185, indexer 160 can cause "N" replicas of the indexed stream data file 185 to be generated across nodes of the streaming service 150 cluster. An indexed stream data file 185 can be registered with index registry 174 of the query interface 170 so that query processor 172 can quickly determine, without a call to indexer API 165, that a stream has been indexed. Index register 174 can store information that associates a stream identifier with the indexed data stream 185 filename associated with the stream.

When query interface 170 receives a query from a client device 130, query interface 170 can call query processor 172 to determine the indexes for the streams 120 specified in the query. Query processor 172 can parse the query to determine the streams specified in the query, a time range for the stream data, search terms, and a database action to be performed on the resulting stream data that matches the query. Query processor can also determine whether there is an indexed data stream file 125 that matches the client 130 query, based on the indexing specification 148 used to generate the indexed data stream file 125. Alternatively, client 130 query can explicitly specify the index data file 185 that corresponds to the sub-stream(s)s and/or sub-intervals of interest to the querying client 130 for the relevant data stream 120.

The client 130 query can contain a database action, e.g., search, update, delete or read database records. Query processor 172 can call query API 175 to request service from indexer 160. Indexer 160 can receive the service request from query API 175 and access stream database 181 to determine information about the requested stream(s). Information about the requested streams can include whether the requested stream data 120 is currently generating new log data records on the streaming service 150 or the requested stream is stored as an indexed stream data file 185. If any streams specified in the query are not declared as searchable, and thus do not have a indexed stream data file 185, then indexer API 165 can return a notification to the query API 175 that one or more streams indicated in the query are not searchable within the streaming service 150. If any of the streams requested in the query do not yet have an indexed stream data file 185, then indexer 160 can call indexer API 165 to generate an indexed stream data file 185 for the requested stream. Indexer API 165 can return, to calling query API 175, a notification that all streams specified in the query now have a corresponding indexed stream data file 185. The notification can further include an identifier of the indexed stream data file 185 corresponding to each data stream specified in the query, and specified in the query API 175 call to the indexer 160.

When query API 175 receives the notification from indexer 160 that all streams satisfying the query have a corresponding indexed stream data file 185, then query processor 172 or query API 175 can read the index stream data file 185 for each stream specified in the client 130 query, and generate a full-text search index 190 for the query. In an embodiment, the full-text search index 190 can be an inverted index. Query processor 172 can then use the full-text search index 190 to determine terms and data records that match the client 130 query, and retrieve the records from the indexed stream data 185 files for the stream. Query interface 170 can then return the records as query results to the client 130, or otherwise perform the database action. In an embodiment, when the database action is "search," the query interface 170 returns the query results to the client 130. In an embodiment, when the database action is "delete," the selected records matching the query are marked for deletion. In an embodiment, when the client 130 query specifies that the database action is "update," then the records matching the query are updated as specified in the query.

Query interface 170 can generate a full-text search index 190 for the streams referenced in the client 130 query, over the time interval specified in the query, and for the subset of the stream data specified in the query. Alternatively, the client 130 query can issue the query against an indexed data stream 185 whose indexing specification 148 is known to specify the sub-stream(s) of data stream 120 that are relevant to the user, and/or for the time interval specified in the indexing specification 148. Generating a full-text search index 190 for a specified data stream can include traversing the corresponding index stream data file 185 to generate the full-text search index 190 for the stream. Traversing an indexed stream data file 185 for a specified time interval can include determining a starting interval and an ending interval of time for the query. Query processor 172 can read the index at the starting time interval. A table at the starting time interval, or at the start of the indexed stream data file 185, can include a table that points to the index of the next interval in the indexed stream of data 185. The index at the next interval can be merged with the index from the previous interval to generate the full-text search index 190. A table at the index of this next interval can point to the index of the next interval in the data stream index 185. The process of traversal and merging of interval indexes can continue until the ending interval in the query has been reached and the index at the interval has been merged with the full-text search index 190 for the indexed stream of data 185. The full-text search index 190 for a stream can include pointers to terms and to stream log data records in the indexed stream data file 185. Query processor 172 can use the full-text search index 190 to directly access the terms and stream log records for satisfying the query. In an embodiment, query processor 172 can merge the full-text search index 190 for all streams specified in the query, and determine terms and stream log data records that match the query from the merged full-text search index 190. Since the full-text search index 190 for all streams specified in the query is built from indexes in the indexed stream data files 185, and the indexes at the intervals of the indexed stream data files 185 contain pointers to the log data records for the interval, the full-text search index 190 can be used to directly read data records from the corresponding indexed stream data file 185.

Figure 3:
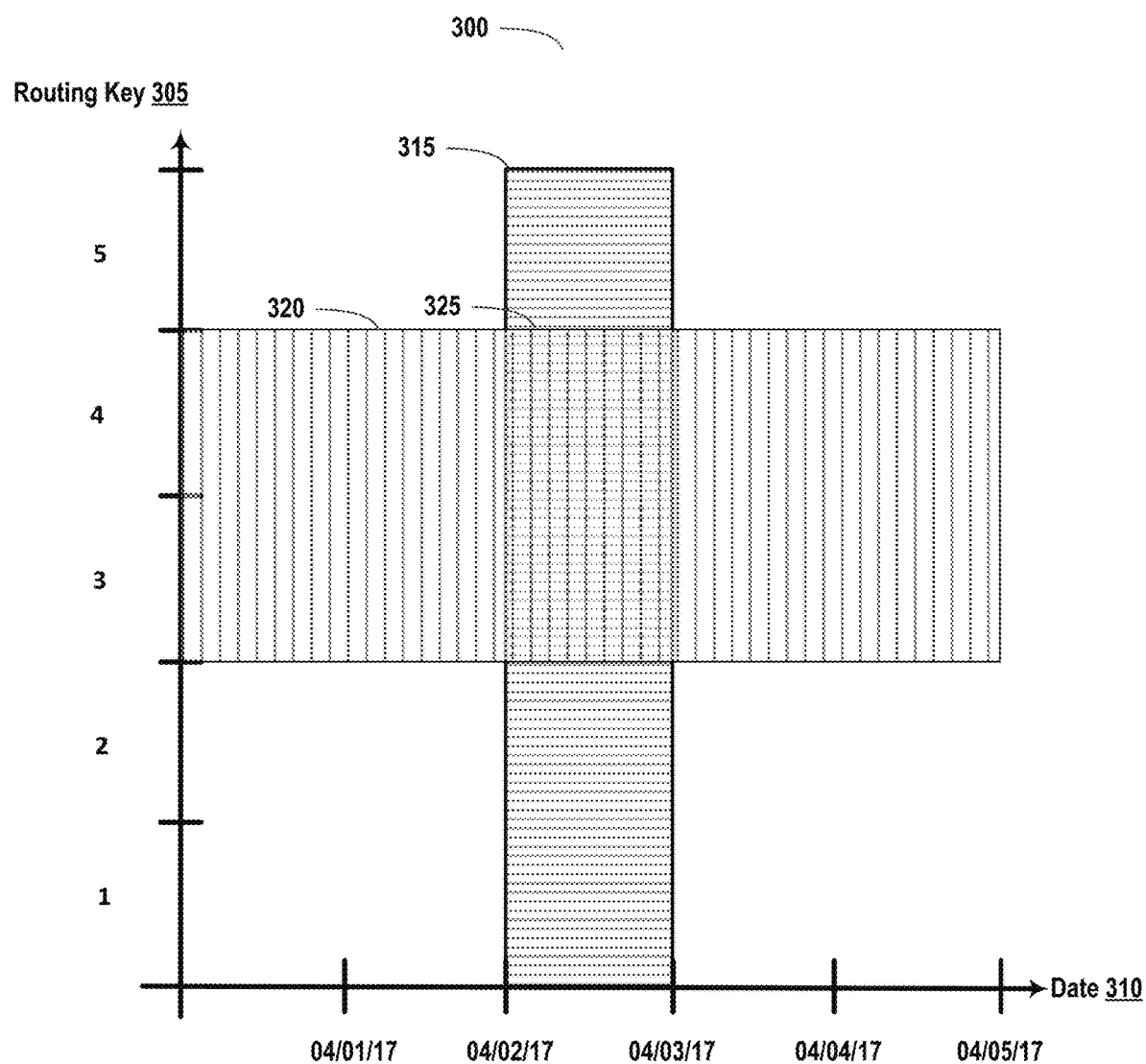
FIG. 3 illustrates, in block diagram form, indexing a slice of a data stream, in accordance with some embodiments.

FIG. 3 illustrates, in block diagram form, slicing a data stream 300 in both time and sub-streams. A slice of a data stream 120 can refer to either one or more sub-streams of a data stream 120, or a temporal sub-interval of the data stream 120, or both. The slice(s) of the data stream to be indexed can be specified in an indexing specification 148.

A data stream 120 may comprise many sub-streams. Each sub-stream can have a routing key 305. In an example, a data stream 120 may contain raw data for a large plurality of sensors within a particular building. There may be many $CO_2$ sensors, temperature sensors, oxygen sensors, light detectors, and other instruments in the building. $CO_2$ sensors may have, e.g. routing key 1, temperature sensors may have routing key 2, oxygen sensors may have routing key 3, light detectors may have routing key 4, etc. Each sub-stream may further be broken down, such as by manufacturer, or by zone or location within the building. Each data stream 120 can also span a plurality of intervals of time, such as 1 day, 1 hour, 1 minute or 1 second. An indexing specification 148 can be designed for this example such that data for routing key 3 (oxygen sensors) and routing key 4 (light detectors) data (collectively, reference 320) is indexed for the date of Apr. 2, 2017 (reference 315). The intersection of these two slices is represented by their intersection, 325. Thus, indexing specification 148 for the above example will cause indexer 160 to generate an indexed stream data file 185 that indexes oxygen sensor and light detector data for the particular building for the date Apr. 2, 2017. A client 130 query can specify this particular index to quickly find the data of interest. The query results will include only those sub-streams and time intervals that are of interest to the user. Thus, the client 130 query need not specify the sub-streams or the time interval because these criteria are explicitly in the indexing specification 148. Therefore the indexed stream data file 185 contains index information for only the specified sub-streams and time interval(s).

Figure 4:
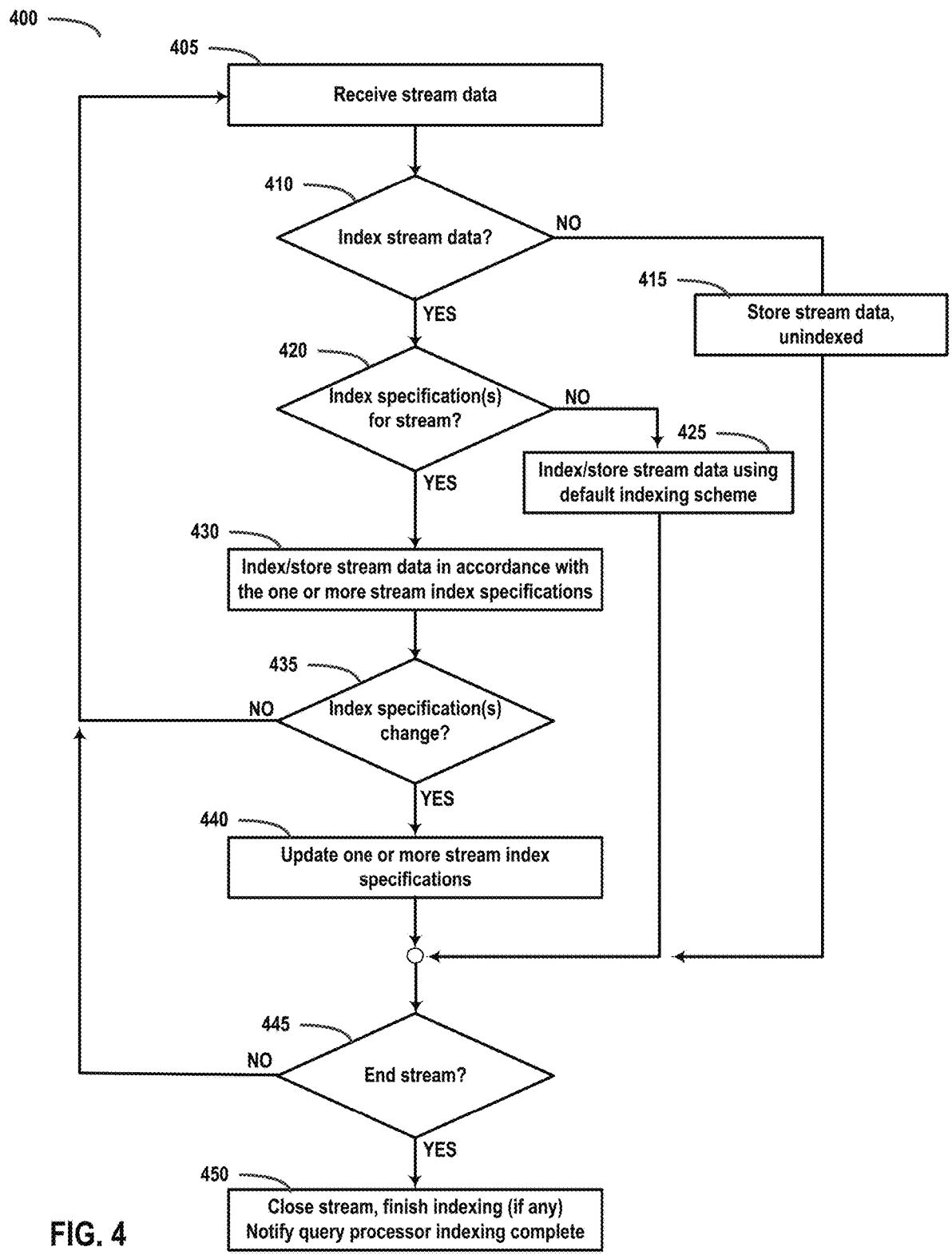
FIG. 4 illustrates a method of efficiently indexing a data stream as the data stream is ingested by a streaming service, in accordance with some embodiments.

FIG. 4 illustrates a method 400 of efficiently indexing a data stream 120 as the data stream is ingested by a streaming service 150, in accordance with some embodiments.

In operation 405, stream processor 155 can receive stream data 120. Stream processor can generate a message queue 157 for the stream data 120, and generate log data records in the message queue 157 for possible indexing by indexer 160.

In operation 410, it can be determined whether the stream data 120 should be indexed. Indexer 160 can access stream database 181 to determine whether the stream 120 has been declared as searchable on the streaming service 150. If it is determined that stream 120 has not been declared as searchable, then data stream 120 should not be indexed, and method 400 continues at operation 415. Otherwise method 400 continues at operation 420.

In operation 415, stream processor 155 can store stream data 120 in unindexed stream data file 180. Method 400 continues at operation 445.

In operation 420, it can be determined whether there is an indexing specification 148 for the data stream 120. Indexer 160 can access specifications database 147 to determine whether there is an indexing specification 148 associated with the data stream. If not, then method 400 continues at operations 425. Otherwise, method 400 continues at operation 430.

In operation 425, no indexing specification 148 has been found for the data stream 120, but the data stream is to be indexed. Indexer 160 can index data stream 120 in accordance with a default indexing scheme. In an embodiment, the default indexing scheme can be to index all sub-streams in the data stream 120 for a default period of time, such as 1 day. Method 400 continues at operation 445.

In operation 430, indexer 160 can index the data stream 120 in accordance with the indexing specification 148 looked up in specification database 147. In an embodiment, a data stream 120 can have more than one indexing specification 148. In such an embodiment, an indexed stream data file 185 can be generated for the data stream 120 in accordance with each such specification for the data stream 120. An indexing specification 148 can specify one or more sub-streams of the data stream 120 for indexing. An indexing specification 148 can alternatively, or in addition, specify an interval of time and starting date/time for that interval, to index. In an embodiment, an indexing specification 148 can specify a type of index for the indexer 160 to use, such as B–Tree, binary tree, inverted index, hash table, or B+Tree.

In operation 435, it can be determined whether the indexing specification(s) 148 have changed since indexing began for this data stream 120. If so, then method 400 continues at operation 440, otherwise method 400 continues at operation 405.

In operation 440, indexer 160 can access the updated indexing specification(s) 148 so that updated indexing specification(s) 148 can be used for indexing the next stream data received.

In operation 445, it can be determined whether the end of the stream has been reached or the stream has received a close instruction. If so, then method 400 continues at operations 450, otherwise method 400 continues at operation 405.

In operation 450, the data stream 120 can be closed. Indexing can be completed, and indexed stream data file(s) 185 can be written. Indexer 160 can notify query processor 172 that indexing has been completed and the indexed stream data file(s) 185 are available for full-text search.

Figure 5:
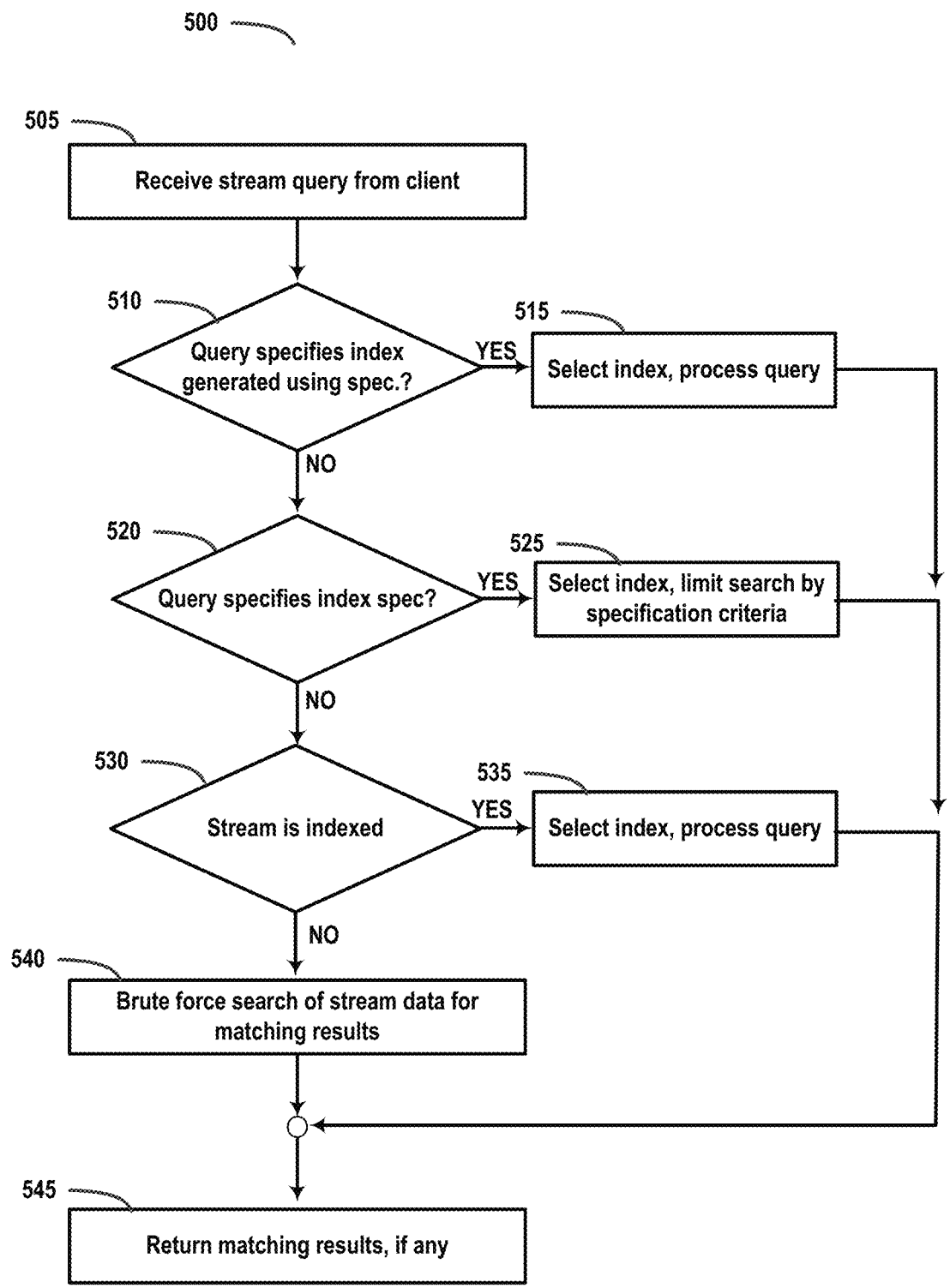
FIG. 5 illustrates a method of processing a query using slices of a data stream, in accordance with some embodiments.

FIG. 5 illustrates a method 500 of a streaming service 150 query processor 172 processing a client 130 query using an indexing specification 148, in accordance with some embodiments. A stream indexing specification 148 can be used to generate an indexed stream data file 185 in accordance with the indexing specification 148. Alternatively, indexing specification 148 can be used by the query processor to limit the scope of search within stream data 120 actually indexed in the indexed stream data file 120. For example, a stream may have been indexed for all sub-streams and all time intervals over a time range that is greater than the scope of interest to the querying client 130. The client 130 can include a reference to an indexing specification 148 that specifies a subset of streams and/or subset of intervals of those actually indexed by the indexed stream data file 185.

In operation 505, query processor 172 can receive a stream query from client 130. The query specifies at least a stream, or an indexed data file 185 of the stream, or a registered name for the stream or index stored in the index registry 174.

In operation 510, query processor 172 can parse the client 130 query to determine whether the query specifies an indexed data stream file 185 that was generated using an indexing specification 148. Query processor 172 can access index registry 174 to make the determination. If the query specifies an indexed data stream file 185 generated using an indexing specification 148, then method 500 continues at operation 515, otherwise method 500 continues at operation 520.

In operation 515, query processor 172 can select the indexed data stream file 185 and apply the query against the index therein to determine query results.

In operation 520, it can be determined whether the client 130 query specifies a stream that was indexed without using an indexing specification, and the client 130 query indicates an indexing specification 148. If so, then method 500 continues at operation 525, otherwise method 500 continues at operation 530. Query processor 172 can make the determination by accessing index registry 174 and specification database 147.

In operation 525, query processor 172 can select the indexed stream data file 185 for the stream, and limit searching within the index to the sub-streams and/or time periods specified in the indexing specification 148.

In operation 530, it can be determined whether the stream indicated in the client 130 query has been indexed. If so, then method 500 continues at operation 535, otherwise method 500 continues at operation 540. Query processor 172 can make the determination by making a call to query API 175 to access indexer 160 to determine whether the stream has been declared as searchable, and if so, the name or identifier of the indexed stream data file 185.

In operation 535, query processor 172 can select the indexed stream data file 185 for the stream and apply the query criteria to the index therein to obtain query results for the client 130.

In operation 540, it has already been determined that the stream indicated in the client 130 query is not indexed. Thus query processor 172 can perform a brute force search against the raw unindexed stream data 180 to find matching query results.

In operation 545, query results are obtained by query processor 172. A database action specified in the client 130 query can be performed upon the query results. A database action can include read, updated, delete, or search the stream data.

Figure 6:
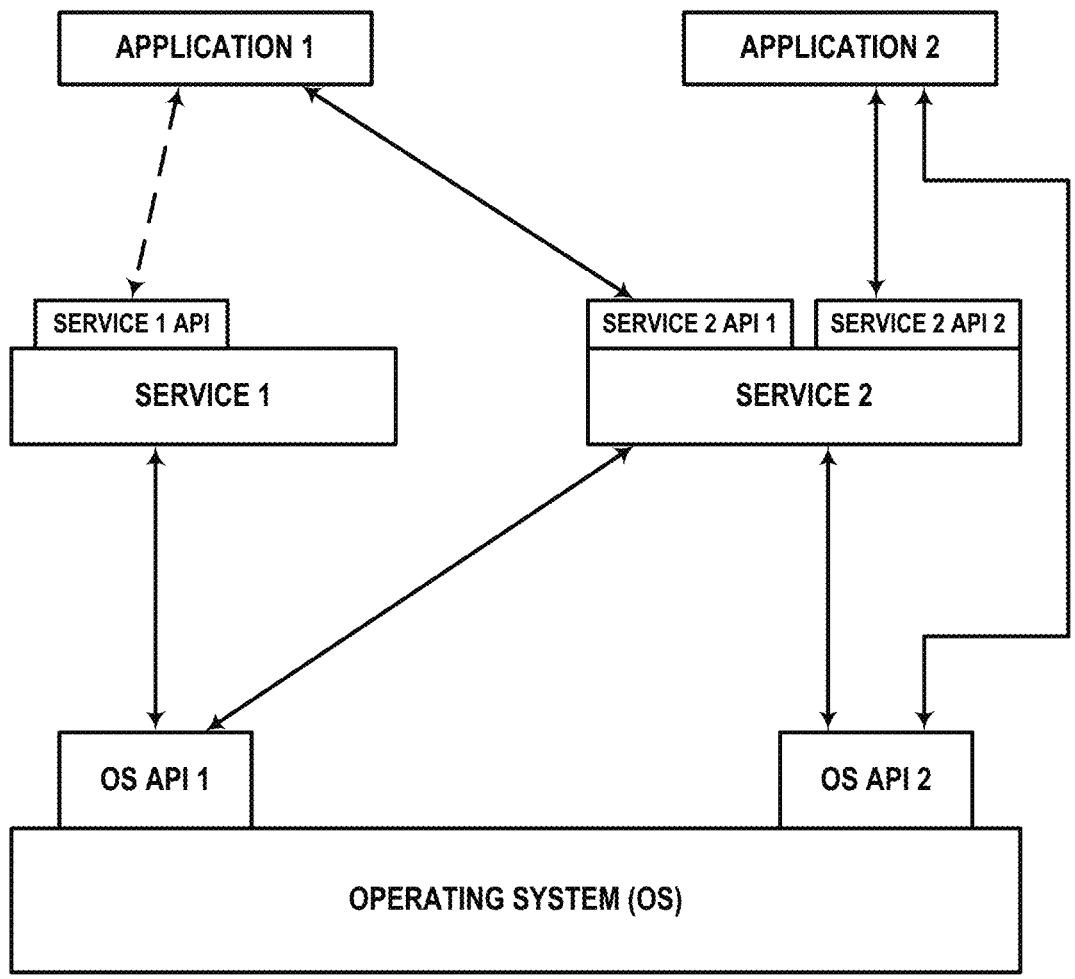
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2

(which can be, for example, a software library) makes calls to and receives returned values from both as API 1 and OS API 2, Application 2 makes calls to and receives returned values from as API 2.

Figure 7:
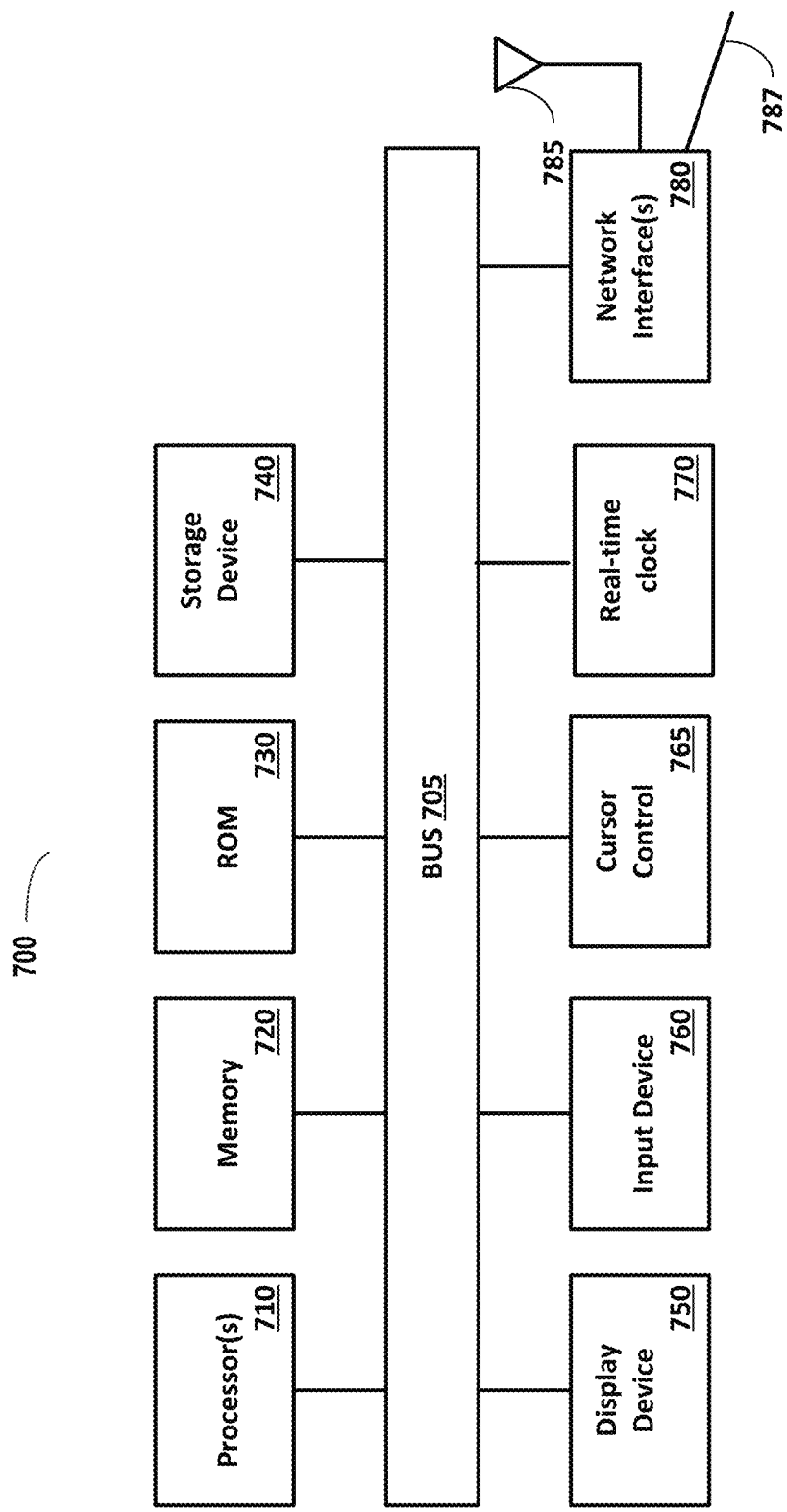
FIG. 7 illustrates an exemplary computing platform for client devices, cluster nodes, and other processing systems that implement the indexing functionality disclosed herein, in accordance with some embodiments.

FIG. 7 is a block diagram of one embodiment of a computing system 700 for client devices, streaming service cluster nodes (storage units, back plane, or processing unit), and other processing systems that implement the virtual stream functionality disclosed herein, in accordance with some embodiments. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), touchscreen, or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method performed by a server for efficiently indexing a portion of a stream data, comprising:

accessing a stream database that has been declared searchable;

accessing a database of indexing specifications to determine whether an indexing specification exists for the stream data;

in response to determining that the indexing specification exists for the stream data:

receiving one or more stream index specifications associated with a stream, each of the one or more stream index specifications comprising one or more rules for indexing the stream, wherein a stream index specification specifies a portion of stream data of the stream to index and identifies a list of terms that should be indexed and a list of terms that should not be indexed; and generating one or more stream indexes for the portion of stream data in accordance with the one or more stream index specifications;

otherwise, in response to determining that the indexing specification does not exist for the stream data, generating one or more stream indexes for the portion of the stream data in accordance with a default indexing scheme;

wherein the portion of stream data comprises a temporal subset of the stream data defined by an interval of time;

whereby only a portion of the temporal subset is indexed repeatedly for a plurality of intervals of time to generate a plurality of interval indexes to thereby reduce an amount of computing necessary to index the incoming streaming data; and, when a number of intervals of time exceeds a threshold, merging the plurality of interval indexes and marking a previously written index for deletion to thereby reduce an amount of storage required for storing resulting indexing.

2. The method of claim 1, further comprising:

receiving a change to one or more of the stream index specifications; and generating one or more stream indexes for a second portion of the stream data in accordance with the one or more changed stream index specifications.

3. The method of claim 1, wherein:

the stream comprises a plurality of sub-streams; and the specified portion of the stream data comprises one or more sub-streams of the stream data.

4. The method of claim 3, wherein:

the stream comprises stream data over a period of time;

the specified portion of the stream data comprises a sub-interval of the period of time; and the portion of the stream data indexed includes only stream data which falls within the sub-interval and the subset of the plurality of streams.

5. The method of claim 1, wherein:

the stream comprises stream data over a period of time;

the specified portion of the stream data comprises a sub-interval of the period of time;

and the method further comprises generating a full-text search index in response to a query against a stream index in the one or more stream indexes for the portion of the stream of data.

6. A non-transitory computer readable medium, programmed with executable instructions that, when executed by a processing system, perform operations comprising:

accessing a stream database to determine whether the stream data has been declared searchable;

in response to determining that the stream data has not been declared searchable, storing the stream data unindexed, and in response to determining that the stream data has been declared searchable:

accessing a database of indexing specifications to determine whether an indexing specification exists for the stream data;

in response to determining that the indexing specification exists for the stream data:

receiving one or more stream index specifications associated with a stream, each of the one or more stream index specifications comprising one or more rules for indexing the stream, wherein a stream index specification specifies a portion of stream data of the stream to index and identifies a list of terms that should be indexed and a list of terms that should not be indexed; and generating one or more stream indexes for the portion of stream data in accordance with the one or more stream index specifications;

otherwise, in response to determining that the indexing specification does not exist for the stream data, generating one or more stream indexes for the portion of the stream data in accordance with a default indexing scheme;

wherein the portion of stream data comprises a temporal subset of the stream data defined by an interval of time;

whereby only a portion of the temporal subset is indexed repeatedly for a plurality of intervals of time to generate a plurality of interval indexes to thereby reduce an amount of computing necessary to index the incoming streaming data; and, when a number of intervals of time exceeds a threshold, merging the plurality of interval indexes and marking a previously written index for deletion to thereby reduce an amount of storage required for storing resulting indexing.

7. The medium of claim 6, further comprising:

receiving a change to one or more of the stream index specifications; and generating one or more stream indexes for a second portion of the stream data in accordance with the one or more changed stream index specifications.

8. The medium of claim 6, wherein:

the stream comprises a plurality of sub-streams; and the specified portion of the stream data comprises one or more sub-streams of the stream data.

9. The medium of claim 8, wherein:

the stream comprises stream data over a period of time;

the specified portion of the stream data comprises a sub-interval of the period of time; and the portion of the stream data indexed includes only stream data which falls within the sub-interval and the subset of the plurality of streams.

10. The medium of claim 6, wherein:

the stream comprises stream data over a period of time;

the specified portion of the stream data comprises a sub-interval of the period of time;

and the method further comprises generating a full-text search index in response to a query against a stream index in the one or more stream indexes for the portion of the stream of data.

11. A processing system, comprising a hardware processor coupled to a memory programmed with executable instructions, that when executed by the processing system, perform operations comprising:

accessing a stream database to determine whether the stream data has been declared searchable;

in response to determining that the stream data has not been declared searchable, storing the stream data unindexed, and in response to determining that the stream data has been declared searchable:

accessing a database of indexing specifications to determine whether an indexing specification exists for the stream data;

in response to determining that the indexing specification exists for the stream data:

receiving one or more stream index specifications associated with a stream, each of the one or more stream index specifications comprising one or more rules for indexing the stream, wherein a stream index specification specifies a portion of stream data of the stream to index and identifies a list of terms that should be indexed and a list of terms that should not be indexed; and generating one or more stream indexes for the portion of stream data in accordance with the one or more stream index specifications;

otherwise, in response to determining that the indexing specification does not exist for the stream data, generating one or more stream indexes for the portion of the stream data in accordance with a default indexing scheme;

wherein the portion of stream data comprises a temporal subset of the stream data defined by an interval of time;

whereby only a portion of the temporal subset is indexed repeatedly for a plurality of intervals of time to generate a plurality of interval indexes to thereby reduce an amount of computing necessary to index the incoming streaming data; and, when a number of intervals of time exceeds a threshold, merging the plurality of interval indexes and marking a previously written index for deletion to thereby reduce an amount of storage required for storing resulting indexing.

12. The system of claim 11, further comprising:
receiving a change to one or more of the stream index specifications; and
generating one or more stream indexes for a second portion of the stream data in accordance with the one or more changed stream index specifications.

13. The system of claim 11, wherein:
the stream comprises a plurality of sub-streams; and
the specified portion of the stream data comprises one or more sub-streams of the stream data.

14. The system of claim 13, wherein:
the stream comprises stream data over a period of time;
the specified portion of the stream data comprises a sub-interval of the period of time; and
the portion of the stream data indexed includes only stream data which falls within the sub-interval and the subset of the plurality of streams.

15. The system of claim 11, wherein:
the stream comprises stream data over a period of time;
the specified portion of the stream data comprises a sub-interval of the period of time;
and the method further comprises generating a full-text search index in response to a query against a stream index in the one or more stream indexes for the portion of the stream of data.

16. The computer-implemented method of claim 1, further comprising:
receiving a query from a client device for a subset of stream data, wherein the query includes a reference to a stream index of at least a portion of the subset of stream data, wherein the stream index was generated using the stream index specification;
identifying query results using the stream index of at least the portion of the subset of the stream data, wherein the query results identified using the stream index that was generated using the index specification limit the identified query results to those query results that match the stream index specification, wherein the stream index specification specifies a portion of the stream data to index and identifies a list of terms that should be indexed and a list of terms that should not be indexed; and
returning the query results to the client device.

17. The method of claim 16, wherein the portion of the subset of the stream data comprises at least one of:
a sub-stream of the stream data indexed by the referenced index; or
a sub-interval of a period of time of the stream data indexed by the referenced index.

18. The non-transitory computer-readable medium of claim 6, further comprising:
receiving a query from a client device for a subset of stream data, wherein the query includes a reference to a stream index of at least a portion of the subset of stream data, wherein the stream index was generated using the stream index specification;
identifying query results using the stream index of at least the portion of the subset of the stream data, wherein the query results identified using the stream index that was generated using the index specification limit the identified query results to those query results that match the stream index specification, wherein the stream index specification specifies a portion of the stream data to index and identifies a list of terms that should be indexed and a list of terms that should not be indexed; and
returning the query results to the client device.

19. The medium of claim 18, wherein the portion of the subset of the stream data comprises at least one of:
a sub-stream of the stream data indexed by the referenced index; or
a sub-interval of a period of time of the stream data indexed by the referenced index.

20. The processing system, of claim 11, further performing operations comprising:
receiving a query from a client device for a subset of stream data, wherein the query includes a reference to a stream index of at least a portion of the subset of stream data, wherein the stream index was generated using the stream index specification;
identifying query results using the stream index of at least the portion of the subset of the stream data, wherein the query results identified using the stream index that was generated using the index specification limit the identified query results to those query results that match the stream index specification, wherein the stream index specification specifies a portion of the stream data to index and identifies a list of terms that should be indexed and a list of terms that should not be indexed; and
returning the query results to the client device.

21. The system of claim 20, wherein the portion of the subset of the stream data comprises at least one of:
a sub-stream of the stream data indexed by the referenced index; or
a sub-interval of a period of time of the stream data indexed by the referenced index.

* * * * *